(12) United States Patent
Ando et al.

(10) Patent No.: US 12,310,034 B2
(45) Date of Patent: May 20, 2025

(54) SEMICONDUCTOR DEVICE IDENTIFICATION USING PREFORMED RESISTIVE MEMORY

(71) Applicant: International Business Machines Corporation, Armonk, NY (US)

(72) Inventors: Takashi Ando, Eastchester, NY (US); Jonas Doevenspeck, Herent (BE); Youngseok Kim, Upper Saddle River, NJ (US); Soon-Cheon Seo, Glenmont, NY (US); Seyoung Kim, Pohang (KR)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 17/481,842

(22) Filed: Sep. 22, 2021

(65) Prior Publication Data
US 2023/0085995 A1 Mar. 23, 2023

(51) Int. Cl.
*H10B 63/00* (2023.01)
*H01L 23/00* (2006.01)
*H10N 70/00* (2023.01)
*H04L 9/32* (2006.01)

(52) U.S. Cl.
CPC ......... *H10B 63/80* (2023.02); *H01L 23/573* (2013.01); *H10N 70/041* (2023.02); *H04L 9/3278* (2013.01)

(58) Field of Classification Search
CPC ......... H10N 70/24–245; H10N 70/041; H10B 63/88; H01L 23/573; H04L 9/3278
See application file for complete search history.

(56) References Cited

U.S. PATENT DOCUMENTS

| | | | |
|---|---|---|---|
| 8,848,477 B2 | 9/2014 | Schrijen et al. | |
| 9,343,135 B2 | 5/2016 | Zhu et al. | |
| 9,806,718 B2 | 10/2017 | Wallrabenstein | |
| 9,985,791 B2 | 5/2018 | Cambou | |
| 10,469,271 B2 | 11/2019 | Hung et al. | |
| 2018/0123808 A1 | 5/2018 | Hung et al. | |
| 2018/0176012 A1 | 6/2018 | Hung et al. | |
| 2020/0169423 A1* | 5/2020 | Cambou | H04L 9/0866 |
| 2020/0295953 A1 | 9/2020 | Fetterolf et al. | |
| 2021/0091014 A1* | 3/2021 | Charpin-Nicolle | H10B 63/80 |

FOREIGN PATENT DOCUMENTS

KR  101566949 B1  11/2015

OTHER PUBLICATIONS

A. Chen, "Utilizing the Variability of Resistive Random Access Memory to Implement Reconfigurable Physical Unclonable Functions," IEEE Electron Device Letters, vol. 36, No. 2, Feb. 2015, pp. 138-140.

(Continued)

*Primary Examiner* — Laura M Menz
*Assistant Examiner* — Candice Chan
(74) *Attorney, Agent, or Firm* — Samuel Waldbaum; Ryan, Mason & Lewis, LLP

(57) ABSTRACT

A semiconductor device comprises a plurality of resistive memory element structures, at least a subset of the plurality of resistive memory element structures being associated with random analog resistive states. The random analog resistive states of the subset of the plurality of resistive memory element structures provide a unique identification of the semiconductor device.

20 Claims, 12 Drawing Sheets

(56) References Cited

OTHER PUBLICATIONS

N. Gong et al., "Signal and Noise Extraction from Analog Memory Elements for Neuromorphic Computing," Nature Communications, vol. 9, No. 1, 2018, Article 2102, 8 pages.
J. Simpson, "Three Technologies U.S. Defense Agencies are Using to Battle Counterfeit Chips," https://www.sourcetoday.com/industries/media-gallery/21866658/three-technologies-us-defense-agencies-are-using-to-battle-counterfeit-chips, Apr. 4, 2017, 9 pages.

* cited by examiner

100

150

200

250

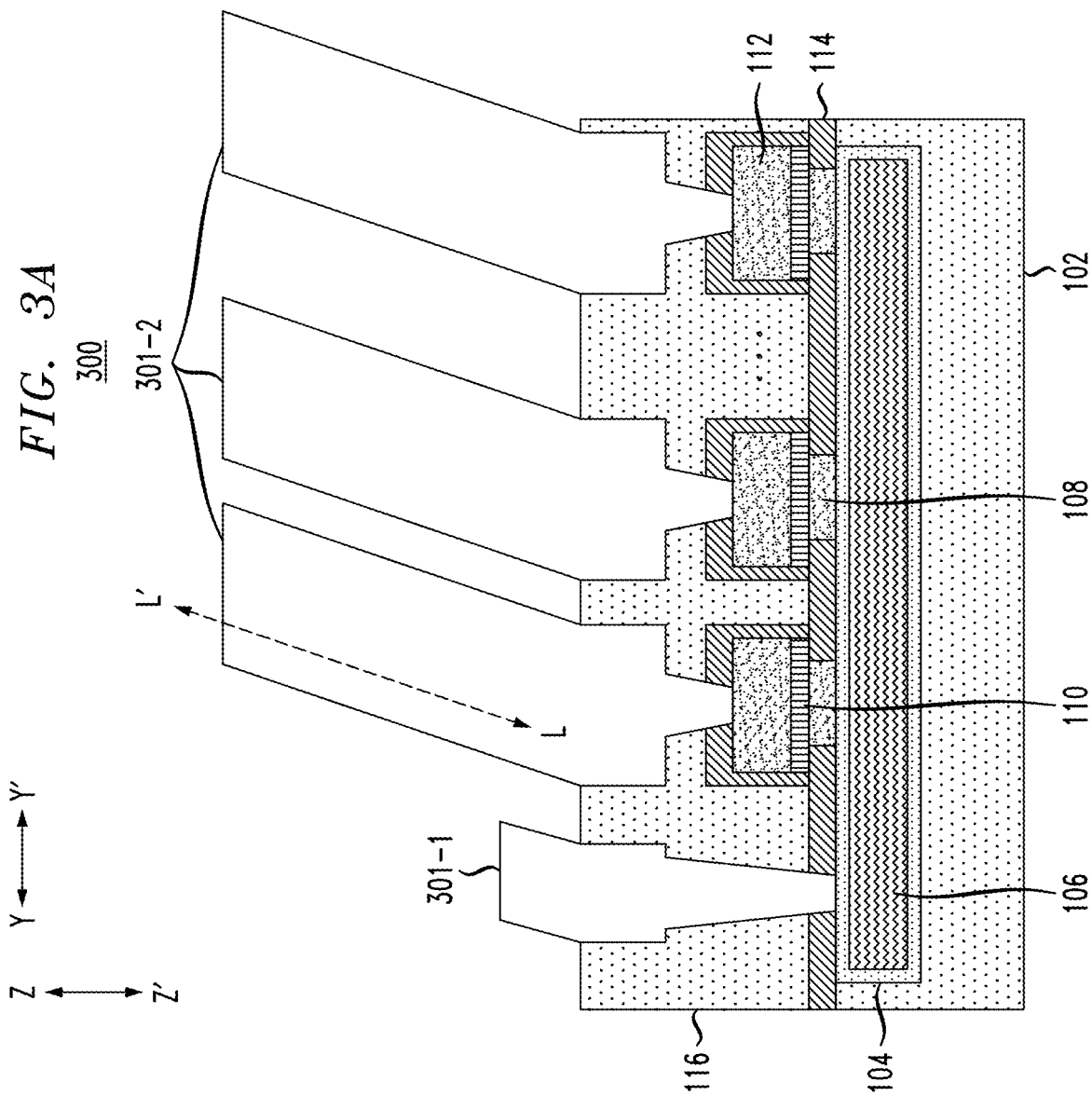

350

400

450

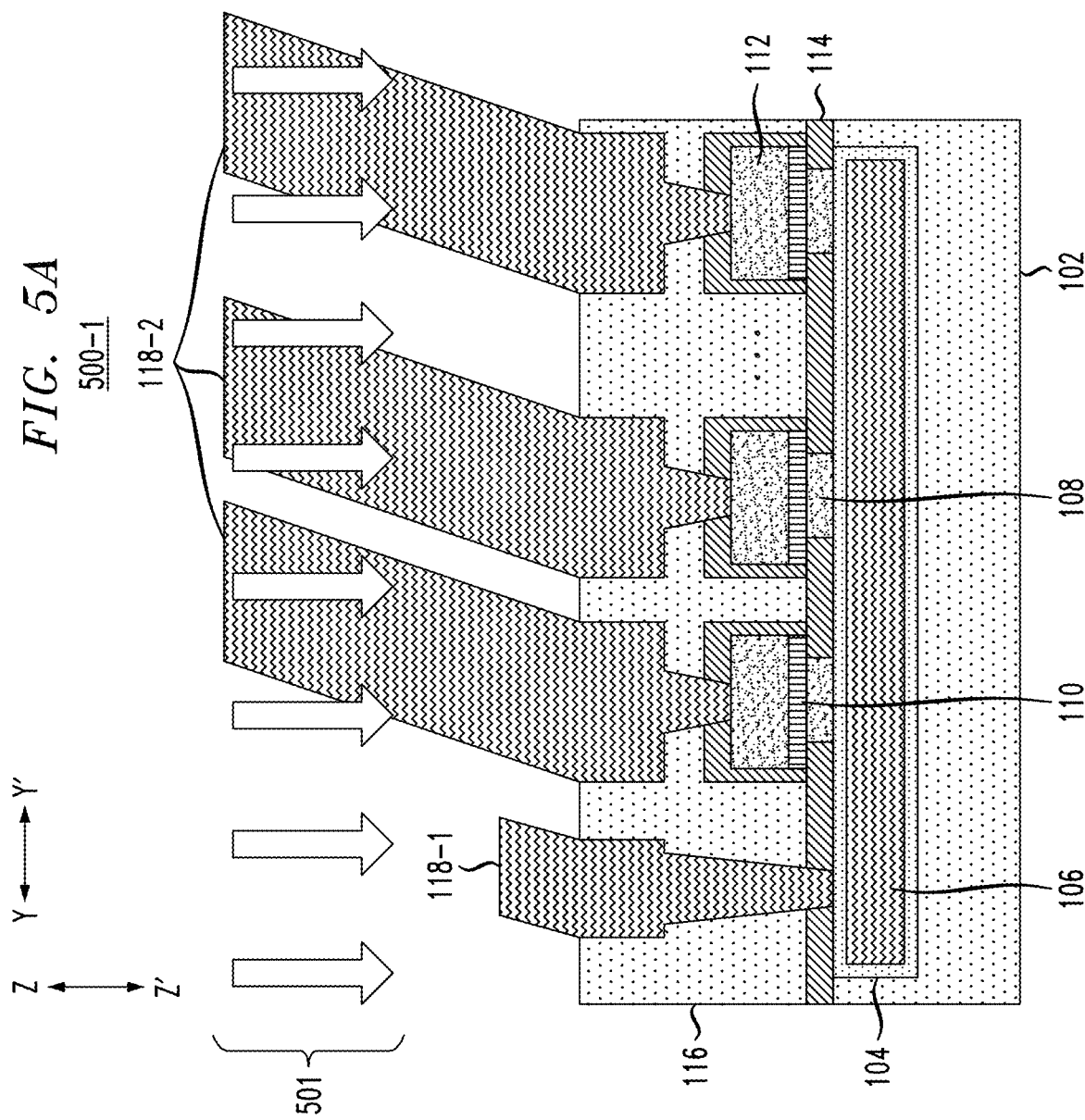

500-2

700

SEMICONDUCTOR DEVICE IDENTIFICATION USING PREFORMED RESISTIVE MEMORY

BACKGROUND

The present application relates to semiconductors, and more specifically, to semiconductor device security. The requirement to provide security in computer systems has led to the development of a variety of approaches for uniquely identifying microprocessors and other semiconductor devices that are part of the computer systems. Such approaches have included methods of inserting unique identification codes into integrated circuits of the semiconductor devices used in the computer systems. The challenge in mass producing semiconductor devices, wherein each die has a unique identification, includes maintaining quick manufacturing time, unclonability, and low costs.

Examples of some existing methods of incorporating unique identifications into semiconductor devices are as follows. A unique identification number may be stored in a non-volatile memory of the semiconductor device or fuses on the device may be blown to create the unique identification. However, these methods require additional circuitry on the semiconductor device resulting in increased size and cost of the individual die. Further, these methods typically yield semiconductor devices which are susceptible to being replicated or cloned.

SUMMARY

Embodiments of the invention provide techniques for providing secure semiconductor device identification using preformed resistive memory element structures.

In one embodiment, a semiconductor device comprises a plurality of resistive memory element structures, at least a subset of the plurality of resistive memory element structures being associated with random analog resistive states. The random analog resistive states of the subset of the plurality of resistive memory element structures provide a unique identification of the semiconductor device.

In another embodiment, an integrated circuit comprises a plurality of resistive memory element structures. A first subset of the plurality of resistive memory element structures provide a physically unclonable function for the integrated circuit, the physically unclonable function comprising a unique identification provided by random analog resistive states associated with the first subset of the plurality of resistive memory element structures. A second subset of the plurality of resistive memory element structures provide memory for the integrated circuit.

In another embodiment, a method comprises forming a plurality of resistive memory element structures and exposing at least a subset of the plurality of resistive memory element structures to a process that sets random analog resistive states in the subset of the plurality of resistive memory element structures.

These and other features and advantages of embodiments described herein will become more apparent from the accompanying drawings and the following detailed description.

BRIEF DESCRIPTION OF THE DRAWINGS

FIGS. 3A and 3B depict views of the structure of FIGS. 2A and 2B following via and trench contact patterning, according to an embodiment of the invention.

FIGS. 5A and 5B depict views of the structure of FIGS. 4A and 4B following selective formation of a barrier layer and a plasma or electron beam irradiation treatment, according to an embodiment of the invention.

DETAILED DESCRIPTION

Figure 1A:
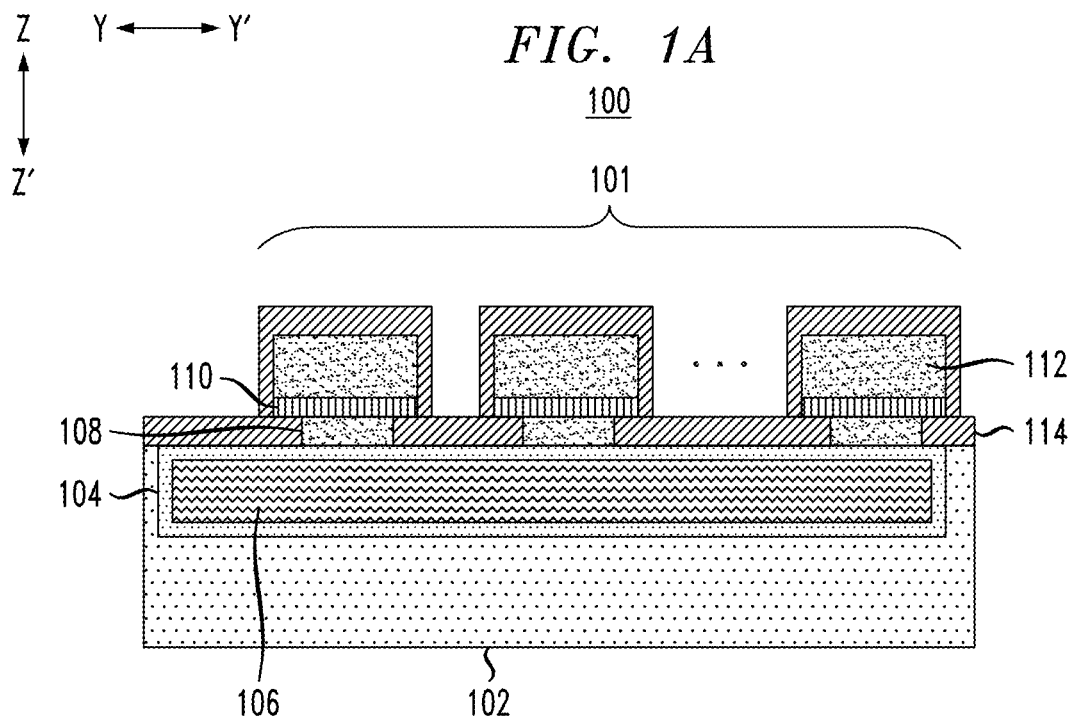
FIGS. 1A-1C depict views of a semiconductor structure including a memory array, according to an embodiment of the invention.

Illustrative embodiments of the invention may be described herein in the context of illustrative methods for forming resistive memory element structures that provide secure semiconductor device identification, along with illustrative apparatus, systems and devices formed using such methods. However, it is to be understood that embodiments of the invention are not limited to the illustrative methods, apparatus, systems and devices but instead are more broadly applicable to other suitable methods, apparatus, systems and devices.

It is to be understood that the various features shown in the accompanying drawings are schematic illustrations that are not necessarily drawn to scale. Moreover, the same or similar reference numbers are used throughout the drawings to denote the same or similar features, elements, or structures, and thus, a detailed explanation of the same or similar features, elements, or structures will not be repeated for each of the drawings. Further, the terms "exemplary" and "illustrative" as used herein mean "serving as an example, instance, or illustration." Any embodiment or design described herein as "exemplary" or "illustrative" is not to be construed as preferred or advantageous over other embodiments or designs.

Semiconductor supply chain integrity is a vital security need in various use case scenarios, including but not limited to national defense. Consider, as an example, a nation which does not have (or has relatively few) "trusted" foundries. That nation will need an approach for verifying that chips installed in critical systems are authentic. For example, phony or counterfeit components, if substituted for real ones, can contain malicious circuitry that results in loss of functionality, snooping, etc.

To provide desired security, approaches may be used to form physically unclonable functions (PUFs) using semiconductor devices. A PUF may be used to facilitate a secure computing environment, by providing a hardware identification or identifier (ID) for an associated semiconductor device or chip. This ID may be used as, for example, an encryption key, and additionally be non-replicable or non-clonable. For example, the ID generated in an integrated circuit chip may be operative as a key that is used for encryption and/or decryption of data that is transmitted or received by the chip.

Conventional approaches may utilize resistive random-access memory (RRAM) devices for a PUF, with the PUF being capable of generating a unique digital fingerprint to identify a semiconductor device or chip including the PUF. Conventional approaches, however, typically require forming and programming steps to generate random patterns. Such conventional approaches require peripheral circuitry for the forming and programming steps. In particular, forming steps require high voltage and circuitry which consumes a large field-effect transistor (FET) area to support such high voltages. Further, conventional approaches which connect a PUF to programming circuitry are susceptible to tampering (e.g., over-write of IDs).

Illustrative embodiments provide an approach that uses process-induced forming of random analog resistive states for RRAM devices used as PUFs. RRAM devices or elements are programmed to various random analog states during the manufacturing process, with such random different analog states providing the ID for the PUF. Advantageously, PUFs formed using the techniques described herein do not require forming/programming, and eliminate the need for circuitry for those operations. This helps to reduce the footprint area, and also isolates portions of the RRAM array used for the PUF (referred to as the PUF array) from tampering. Thus, embodiments enable an otherwise conventional RRAM array to be simultaneously integrated with the PUF array on the same integrated circuit chip. For an integrated circuit chip including both a PUF array and an RRAM array, the area or region of the integrated circuit chip providing the PUF array (referred to as the pre-formed PUF area) is subject to plasma or electron beam irradiation (e-beam) treatment with its upper metal lines exposed, while the area or region of the integrated circuit chip providing the RRAM array (referred to as the RRAM area) is protected with a barrier layer (e.g., formed of silicon nitride (SiN) or another suitable material) during the plasma or e-beam treatment.

As noted above, conventional approaches which utilize RRAM as a PUF require forming and programming of the RRAM devices to random states. Such conventional approaches, however, come with the penalty of complicated periphery circuits. In particular, such forming steps require high voltages which is difficult to handle with state-of-the-art complementary metal-oxide-semiconductor (CMOS) technology with low operation voltages. In addition, if a PUF array is connected to programming circuits, this makes the PUF array vulnerable to tampering (e.g., overwriting of the ID). Illustrative embodiments address these and other disadvantages of conventional approaches by utilizing process-induced forming of RRAM arrays to random states. A plasma or e-beam process is used on an exposed RRAM array (e.g., where the exposed RRAM array corresponds to the PUF array) to form individual devices to random states. This enables an RRAM-based PUF array without forming/programming circuits. The RRAM-based PUF array can be integrated with RRAM-based memory (e.g., in a memory area) by protecting the memory area during the plasma or e-beam process.

Figure 1B:
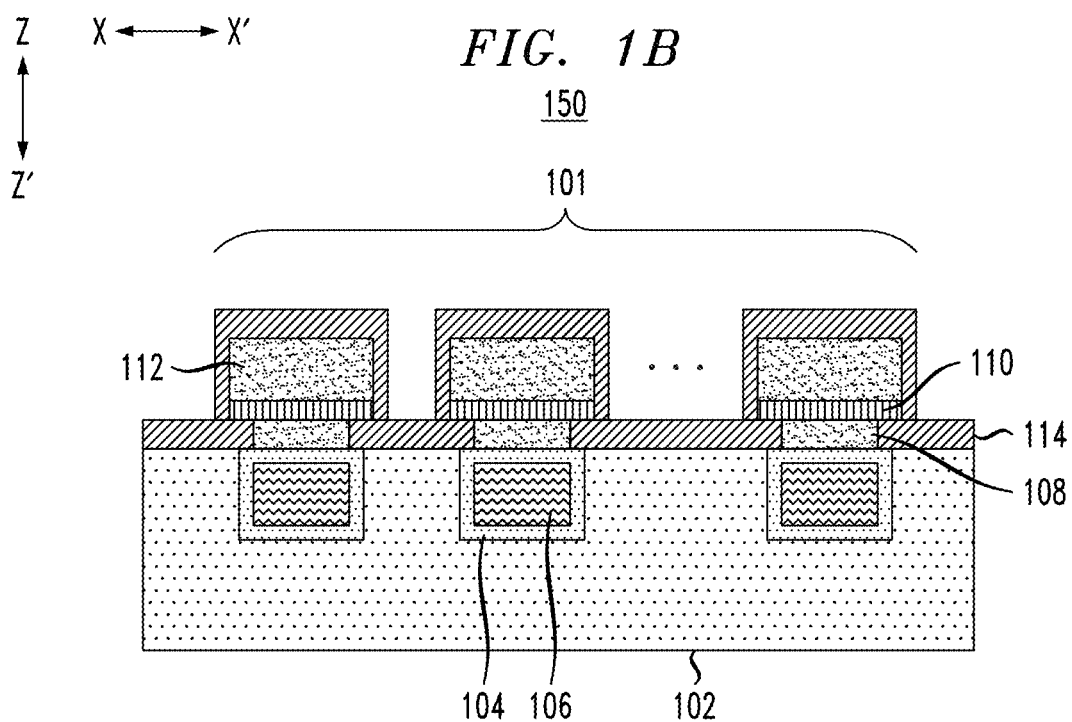
Figure 1C:
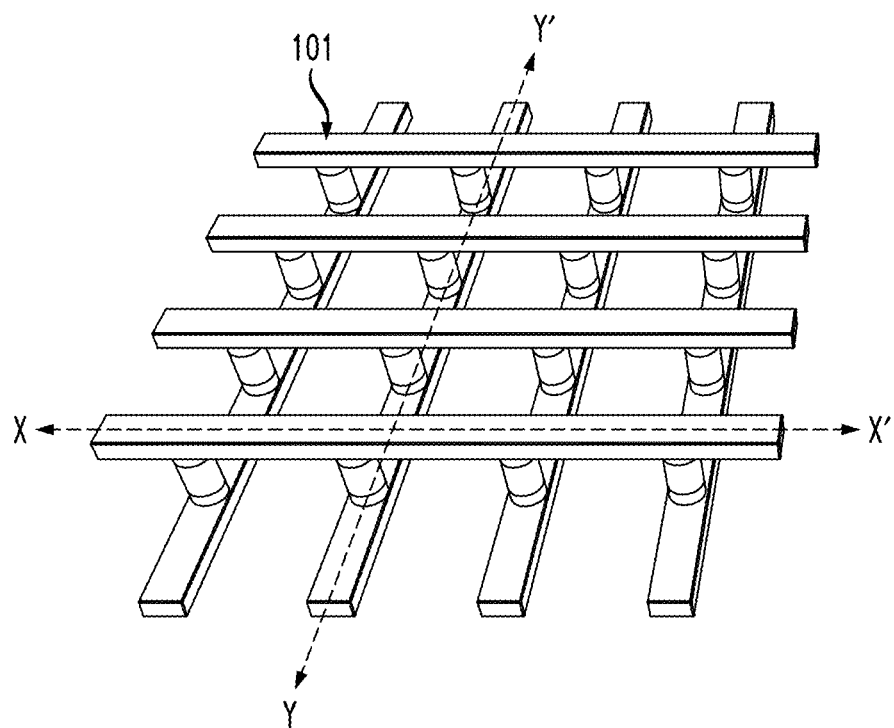

FIGS. 1A-1C depicts views 100, 150 and 175 of a semiconductor structure including an array of RRAM structures 101. FIG. 1A shows a cross-sectional view 100 taken along the y-axis (e.g., the line Y-Y') shown in the top-down view 175 of FIG. 1C, and FIG. 1B shows a cross-sectional view 150 taken along the x-axis (e.g., the line X-X') shown in the top-down view 175 of FIG. 1C. The array shown in FIGS. 1A-1C may include thousands of RRAM structures 101 (e.g., a 1000×1000 RRAM array), though the array may be larger or smaller depending on the application. The structure of FIGS. 1A-1C may include an interlevel dielectric (ILD) layer 102, a bottom metallization liner 104, a bottom metallization layer 106, a bottom electrode 108, a switching layer 110, a top electrode 112, and an encapsulation layer 114.

The ILD layer 102 may be formed of any suitable isolating material, including but not limited to silicon dioxide ($SiO_2$), silicon oxycarbide (SiOC), silicon oxynitride (SiON), etc. The ILD layer 102 is formed with sizing that is sufficient to cover other portions of the structure (e.g., to surround the bottom metallization liner 104 and the bottom metallization layer 106).

The bottom metallization liner 104, which may also be referred to as a metal adhesion layer, may be formed of tantalum nitride (TaN), titanium nitride (TiN), or another suitable material. The bottom metallization liner 104 may have a uniform thickness in the range of 5 to 10 nanometers (nm).

The bottom metallization layer 106 may be formed of a low resistance metal (e.g., copper (Cu), ruthenium (Ru), tungsten (W), cobalt (Co), etc.) that is filled over the bottom metallization liner 104. The bottom metallization layer 106 may be formed with a height (in direction Z-Z') in the range of 50 to 100 nm, and with widths (in direction X-X' and Y-Y') that are based on the number of RRAM structures 101 that are formed.

The bottom electrode 108 and top electrode 112 may be formed of tantalum nitride (TaN), TiN, platinum (Pt), tantalum (Ta), nickel (Ni), or another suitable material. The bottom electrode 108 may have a width (in directions X-X' and Y-Y') in the range of 10 to 300 nm, and a height (in direction Z-Z') in the range of 10 to 100 nm. The top electrode 112 may have a width (in directions X-X' and Y-Y') in the range of 10 to 300 nm, and a height (in direction Z-Z') in the range of 10 to 100 nm.

The switching layer 110 may be formed of hafnium oxide ($HfO_x$) although other suitable materials such as tantalum oxide ($TaO_2$), titanium oxide ($TiO_2$), aluminum oxide ($Al_2O_3$), nickel oxide ($NiO_2$), cerium oxide ($CeO_2$), praseodymium oxide ($Pr_2O_3$) and combinations thereof, etc. may be used. The switching layer may have a height (in direction Z-Z') in the range of 3 to 50 nm, and widths (in directions X-X' and Y-Y') matching those of the top electrode 112.

The encapsulation layer 114 may be formed of a dielectric material, such as SiN, silicon nitride carbide (SiNC), etc. The encapsulation layer 114 may have a uniform thickness in the range of 5 to 30 nm.

Figure 2A:
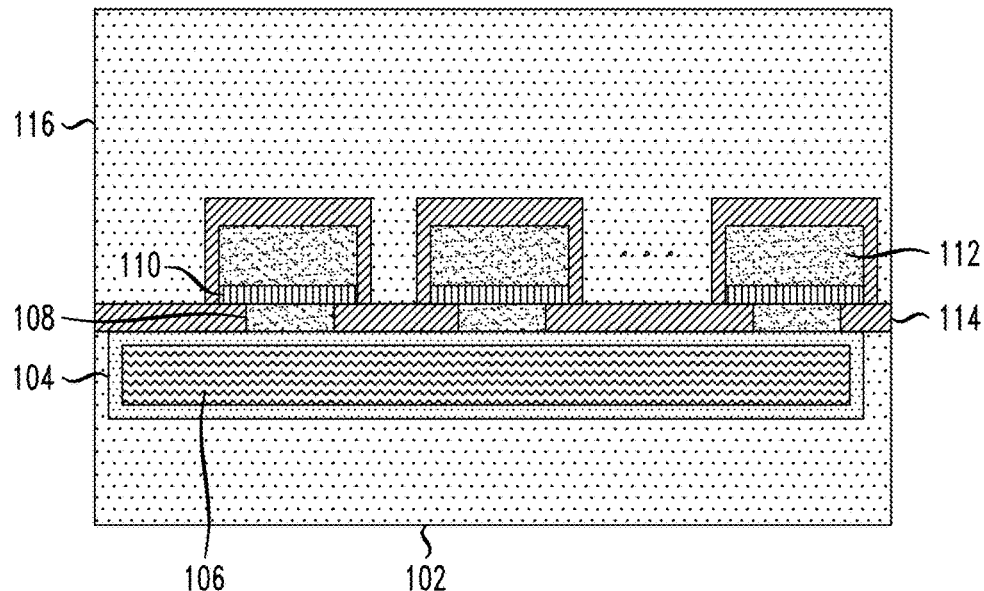
FIGS. 2A and 2B depict views of the structure of FIGS. 1A-1C following formation of an interlevel dielectric layer, according to an embodiment of the invention.
Figure 2B:
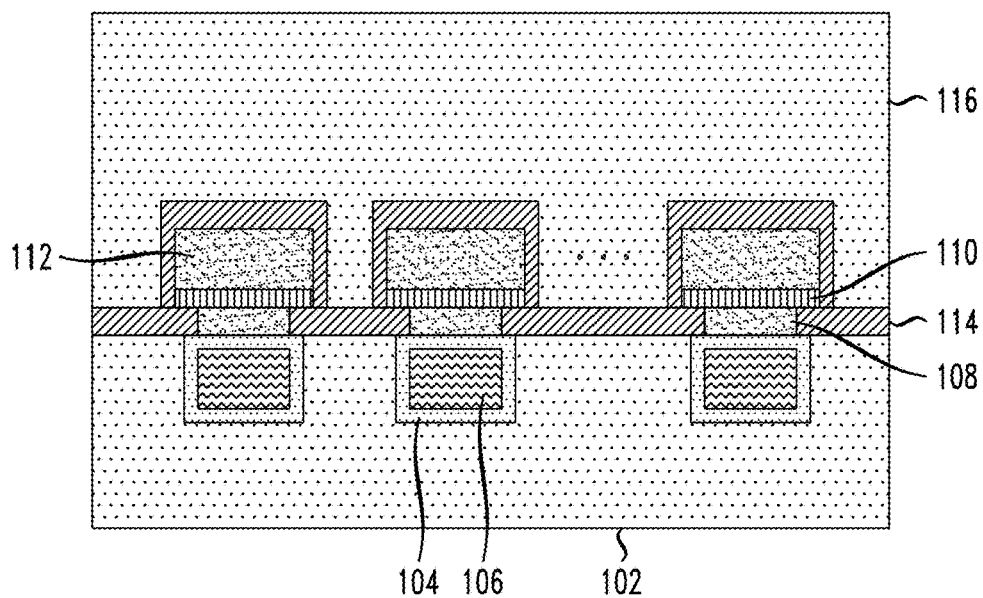

FIGS. 2A and 2B show respective cross-sectional views 200 and 250 of the structure of FIGS. 1A-1C following formation of another ILD layer 116. The cross-sectional views 200 and 250 are taken along the same lines as cross-sectional views 100 and 150 of FIGS. 1A and 1B (e.g., along the y-axis or line Y-Y' shown in top-down view 175 of FIG. 1C, and along the x-axis or line X-X' shown in top-down view 175 of FIG. 1C). The ILD layer 116 may be deposited, and then planarized utilizing chemical mechanical planarization (CMP) or other suitable processing. The ILD layer 116 overfills the structure (e.g., completely covering and overfilling the RRAM structures 101), and thus has a height (in direction Z-Z') which exceeds that of the underlying RRAM structures 101. The ILD layer 116 may be formed of similar materials as the ILD layer 102.

Figure 3B:
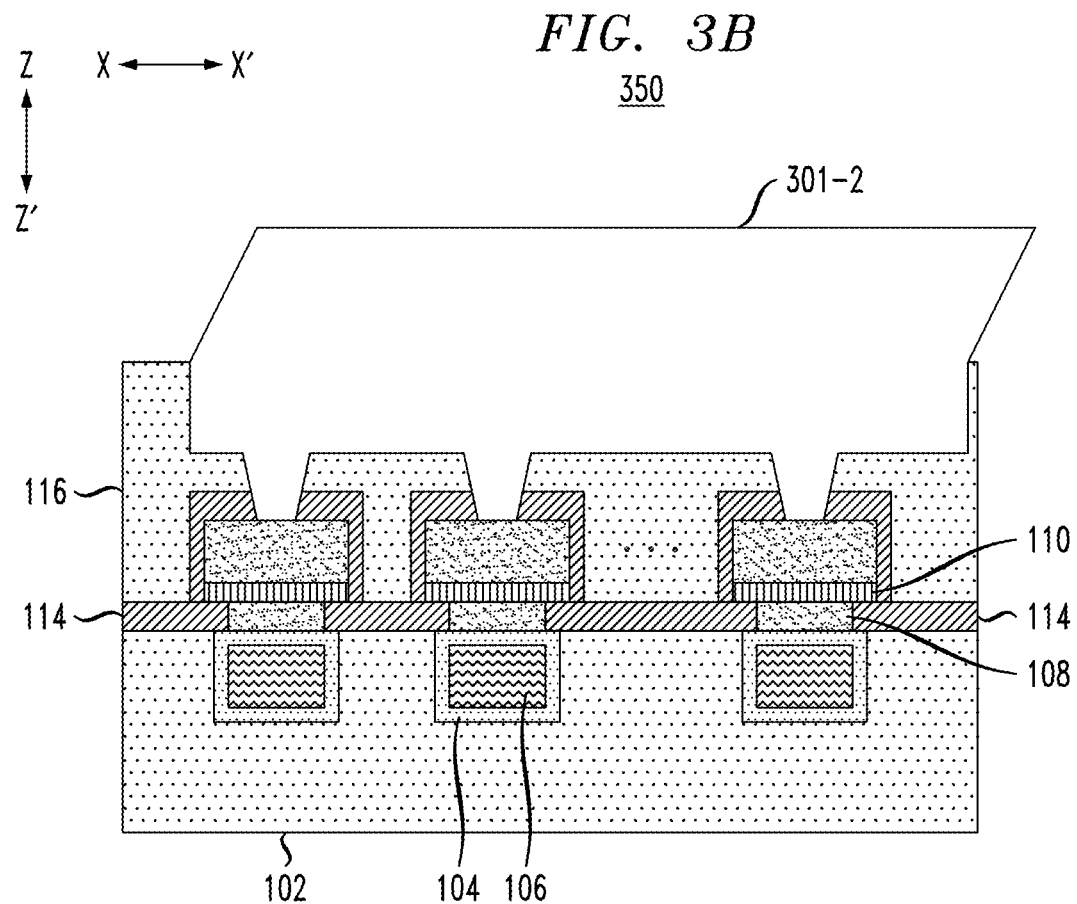

FIGS. 3A and 3B show respective cross-sectional views 300 and 350 of the structure of FIGS. 2A and 2B following via and trench contact patterning. The cross-sectional views 300 and 350 are taken along the same lines as cross-sectional views 100 and 150 of FIGS. 1A and 1B (e.g., along the y-axis or line Y-Y' shown in top-down view 175 of FIG. 1C, and along the x-axis or line X-X' shown in top-down view 175 of FIG. 1C). The via and trench contact patterning includes forming via 301-1 and trenches 301-2. The via 301-1 provides a contact to the bottom metallization layer 106, while the trenches 301-2 provide contacts to the top electrodes 112. Illustratively, the via 301-1 is much smaller than the trenches 301-2. In some embodiments, it is desired to make the via 301-1 as small as allowed, while making the trenches 301-2 as long as possible (in direction L-L') to maximize the allowed area. The patterning of the via 301-1 and trenches 301-2 may be formed using lithography or other suitable processing.

Figure 4A:
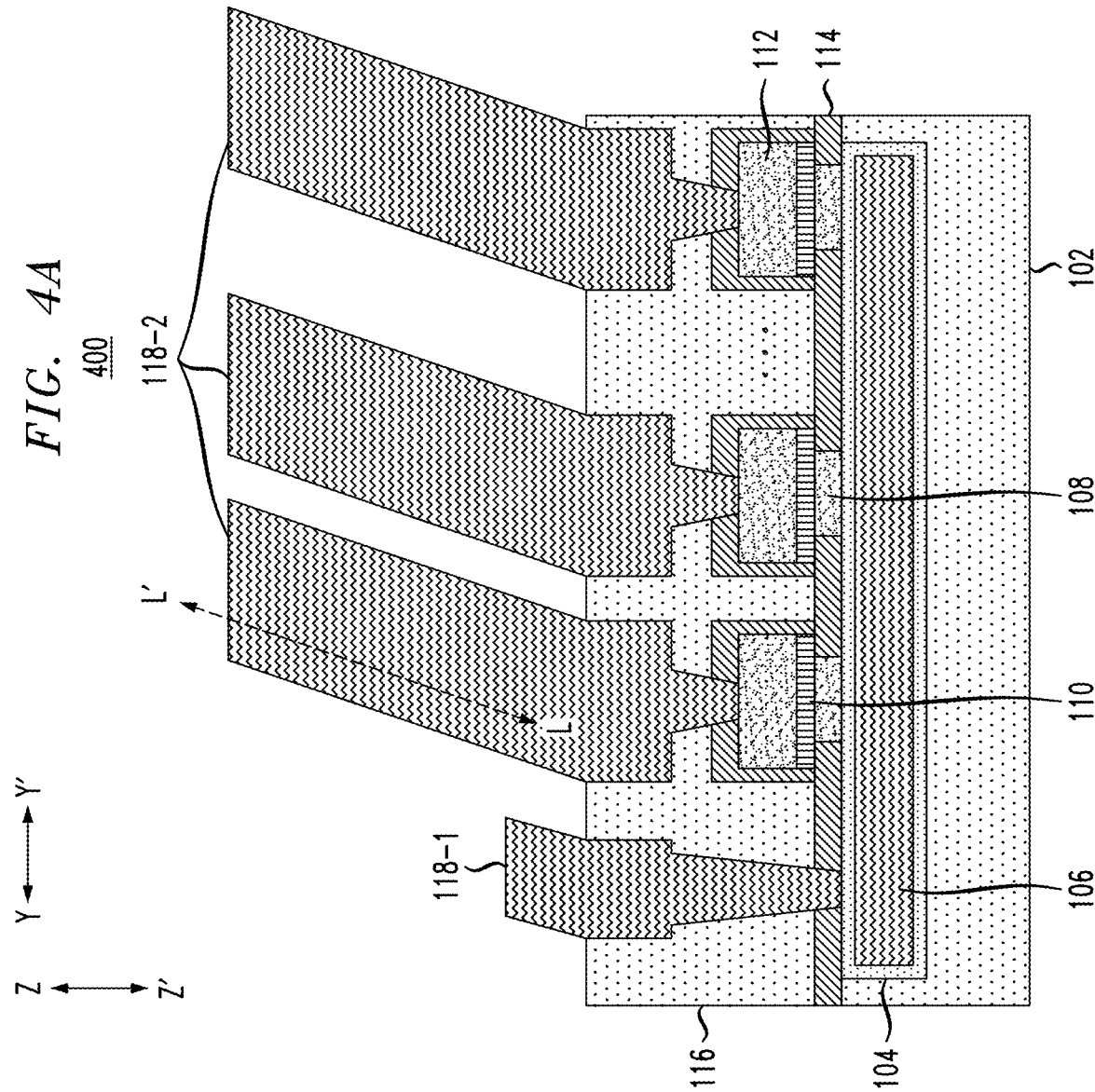
FIGS. 4A and 4B depict views of the structure of FIGS. 3A and 3B following contact metallization, according to an embodiment of the invention.
Figure 4B:
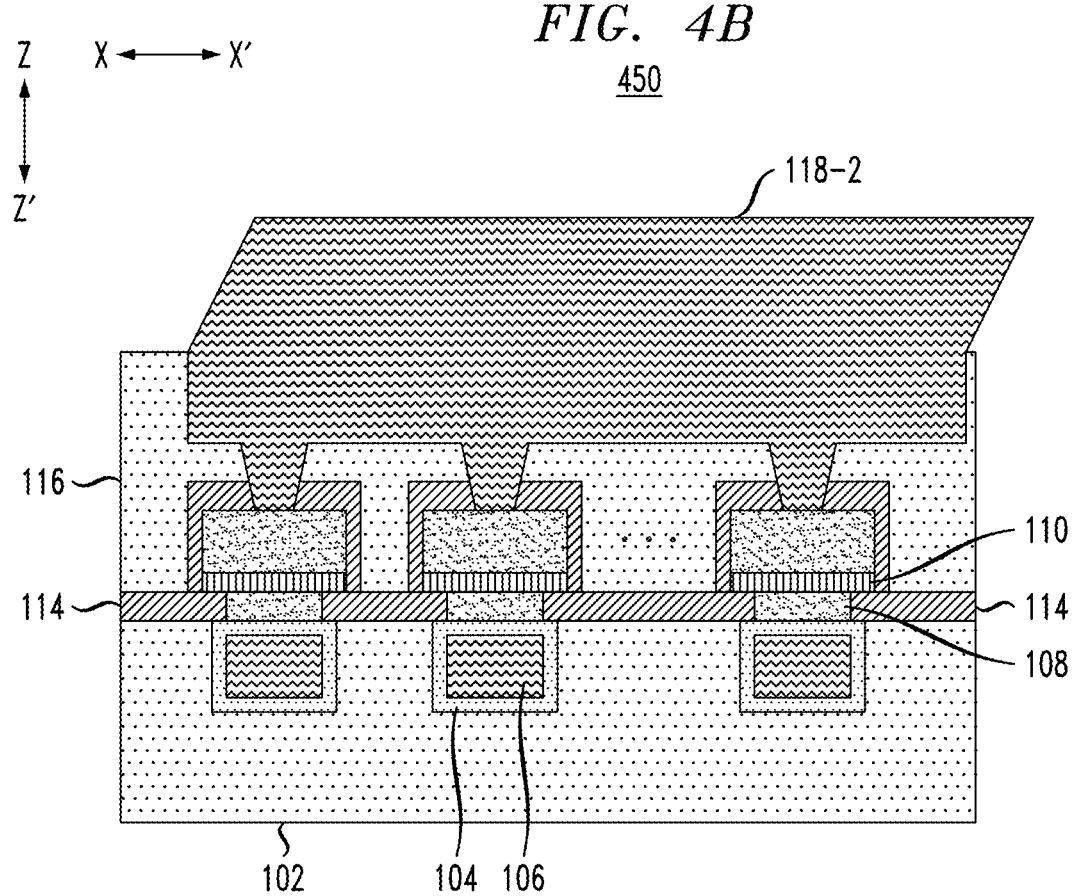

FIGS. 4A and 4B show respective cross-sectional views 400 and 450 of the structure of FIGS. 3A and 3B following contact metallization. The cross-sectional views 400 and 450 are taken along the same lines as cross-sectional views 100 and 150 of FIGS. 1A and 1B (e.g., along the y-axis or line Y-Y' shown in top-down view 175 of FIG. 1C, and along the x-axis or line X-X' shown in top-down view 175 of FIG. 1C). The contact metallization includes filling top metallization layer 118 in the via 301-1 and trenches 301-2. The top metallization layer 118 may be formed of similar materials as that of the bottom metallization layer 106. The material of the top metallization layer 118 may initially be deposited to overfill the structure, followed by CMP or other suitable processing.

Figure 5B:
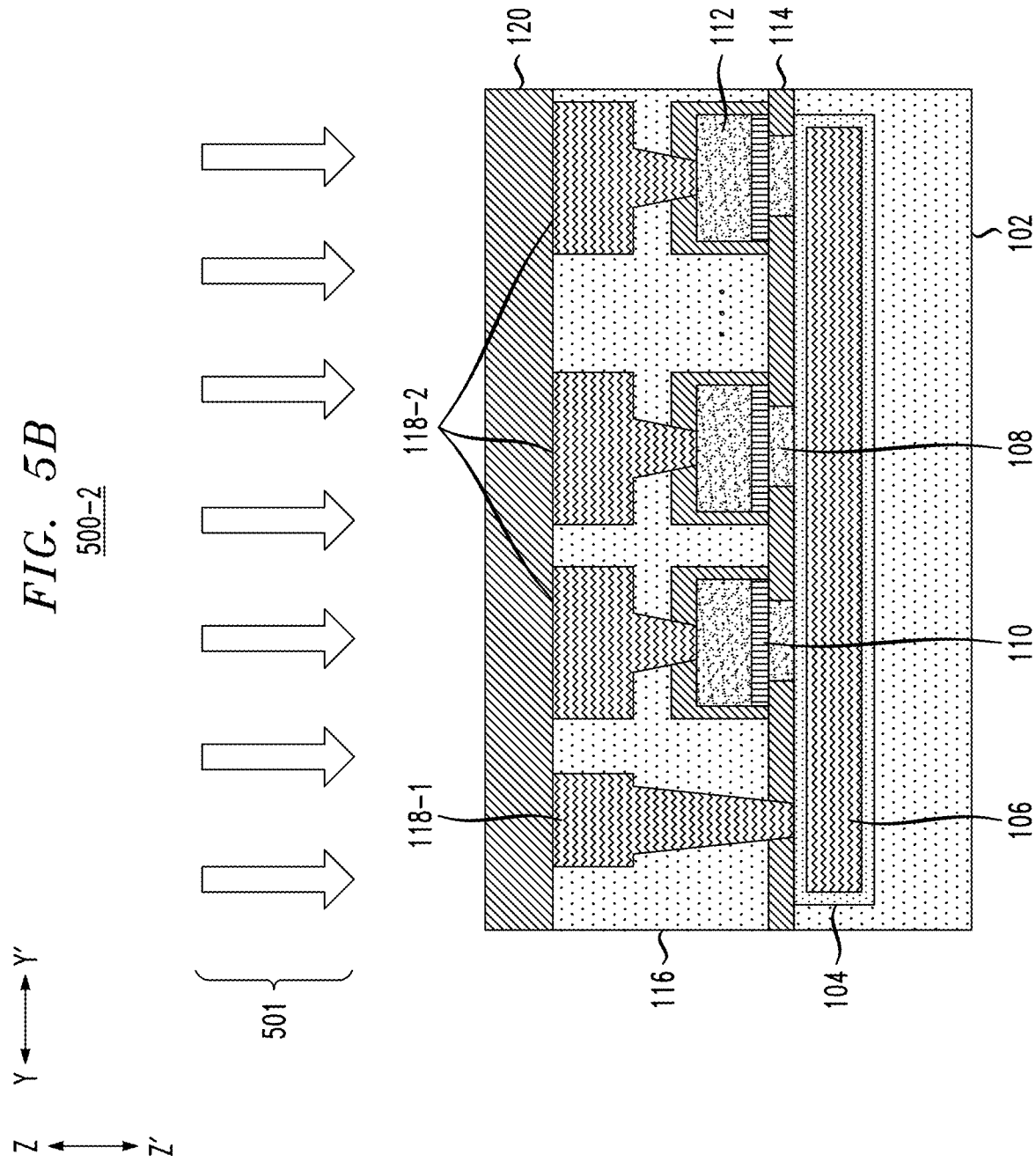

FIGS. 5A and 5B shows respective cross-sectional view 500-1 and 500-2 of the structure of FIGS. 4A and 4B following selective formation of a barrier layer 120, and following a plasma or e-beam treatment 501. The cross-sectional views 500-1 and 500-2 are both taken along the y-axis, but in different areas of the structure. More particularly, cross-sectional view 500-1 is taken in a pre-formed PUF area, while cross-sectional view 500-2 is taken along a memory area. The barrier layer 120 is selectively formed in the memory area as shown in cross-sectional view 500-2, so as to protect the RRAM structures 101 in the memory area during the plasma or e-beam treatment 501. The plasma or e-beam treatment 501 is used to induce an antenna effect in the pre-formed PUF area. More particularly, the plasma or e-beam treatment 501 forms conductive filaments only in the pre-formed PUF area while the memory area is protected by the barrier layer 120. Since the area of the trenches 301-2 is much larger than the area of the via 301-1, the plasma or e-beam treatment induces an antenna in the pre-formed PUF area while this effect is blocked with the barrier layer 120 in the memory area.

In some embodiments, the plasma or e-beam treatment 501 comprises a plasma treatment. The plasma treatment may utilize various tools or techniques, including but not limited to inductively coupled plasma (ICP), capacitively coupled plasma (CCP), and microwave-generated plasma. The plasma treatment may utilize the following conditions: a pressure of 1-2000 millitorrs (mT); a plasma power of 0.3-5 kilowatts (kW); a bias voltage of 0-50 volts (V); a gas chemistry of argon (Ar), nitrogen ($N_2$), hydrogen ($H_2$), helium (He), Xenon (Xe), ammonia ($NH_3$), or a mixture thereof; and a process time of 0.5 to 15 minutes (min). In other embodiments, the plasma or e-beam treatment 501 comprises an e-beam treatment, with the following conditions: an electron energy of 0.01 to 100 kilovolts (kV); and a dose of 100-5000 microcoulombs per square centimeter ($\mu C/cm^2$).

Figure 6A:
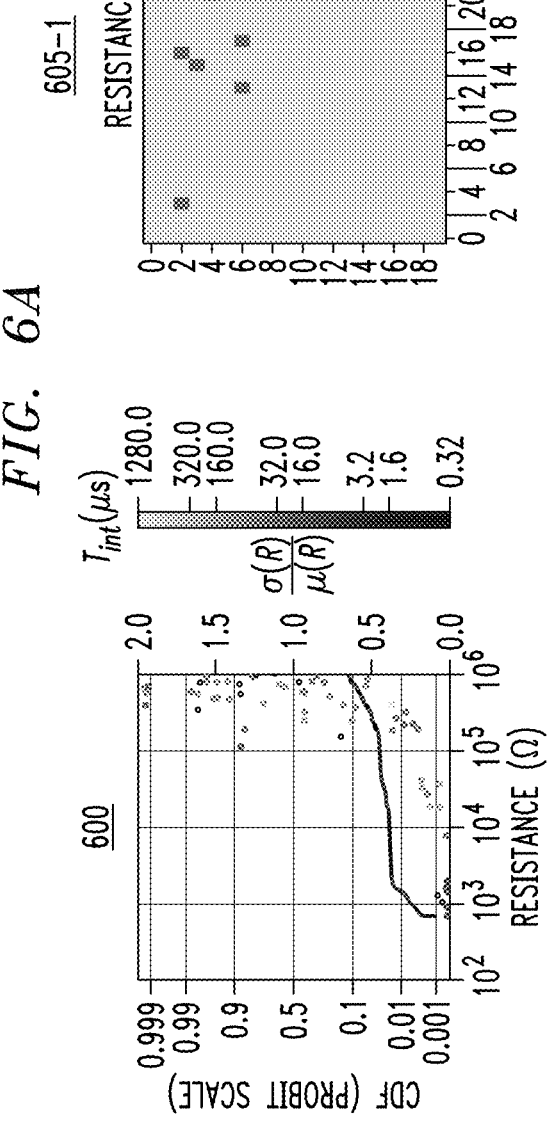
FIGS. 6A and 6B depict plots illustrating plasma-based forming of resistance states in a memory array, according to an embodiment of the invention.
Figure 6B:
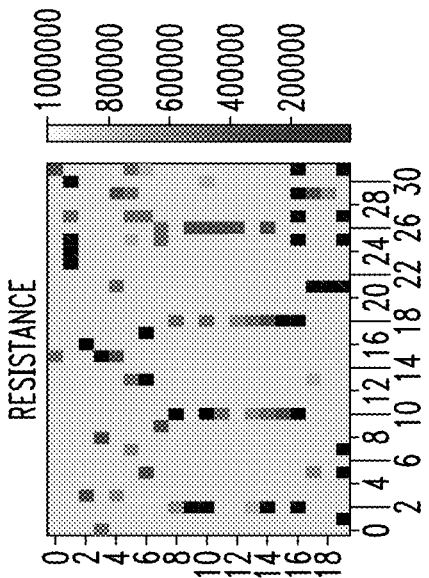
Figure 6B:
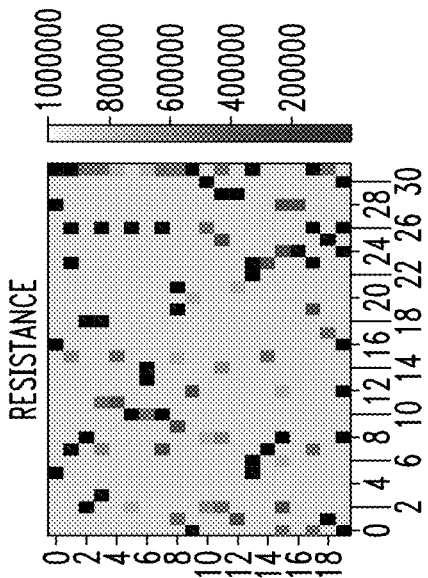
Figure 6B:
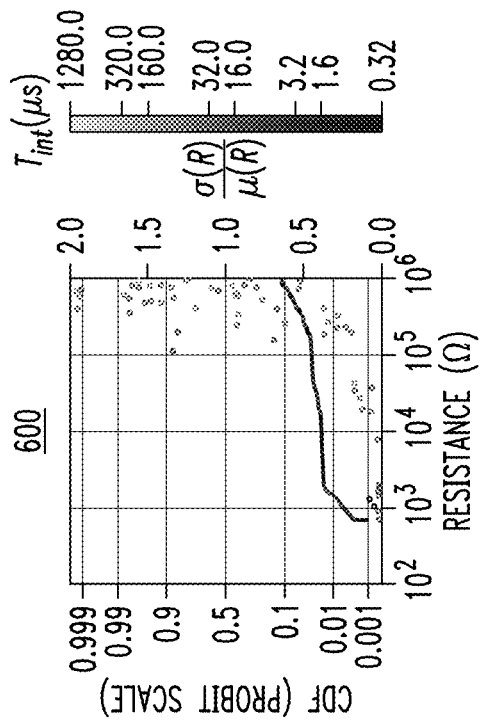
Figure 6B:
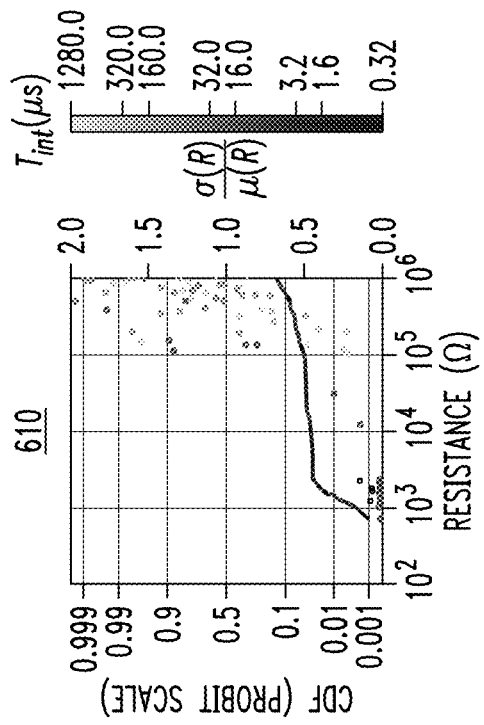

FIGS. 6A and 6B show plots 600, 605-1, 605-2, 610, 615-1 and 615-2, illustrating plasma-based forming to set resistance states of a 20×32 PUF array with random distributions. The plots 600, 605-1 and 605-2 are for a first integrated circuit chip, and the plots 610, 615-1 and 615-2 are for a second integrated circuit chip, where the first and second integrated circuit chips are within a wafer that received the same plasma process. As illustrated, the resistance patterns are random and different for each integrated circuit chip within the wafer that received the same plasma process. The plots 600 and 610 show the cumulative distribution function (CDF), on a probit scale, plotted versus resistance (in ohms (Ω)). The time of the plasma process is also shown (in microseconds (µs)). The plots 605-1 and 615-1 show the resistance values (up to 5 kiloohms (kΩ)) for the 20×32 array, and the plots 605-2 and 615-2 show the resistance values (up to 1 megaohm (MΩ)) for the 20×32 array.

Figure 7:
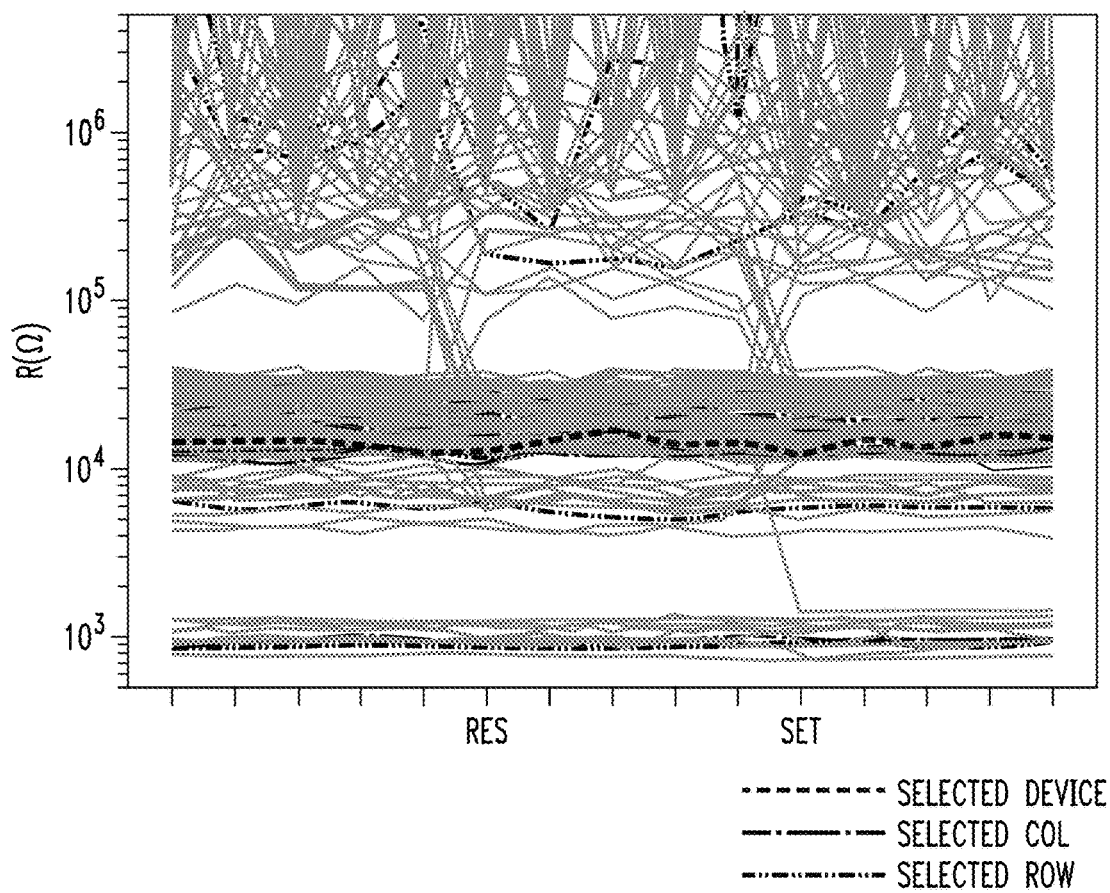
FIG. 7 depicts a plot illustrating that pre-formed resistance states are tamper proof, according to an embodiment of the invention.

FIG. 7 shows a plot 700 of resistance (in Ω) for a PUF array after a series of read, set and reset operations, illustrating that the pre-formed resistance states of the PUF array (induced by the plasma or e-beam process 501) are stable and cannot be modified via external biases (e.g., SET and RESET pules of set and reset operations). In particular, the plot 700 shows a methodology with the following operations: (1) reading resistance states of the array 5 times with a multi $T_{int}$ approach; (2) applying a RESET pulse on one selected device; (3) reading the resistance states of the array 5 times with the multi $T_{init}$ approach; (4) applying a SET pulse on one selected device; and (5) reading the resistance states of the array 5 times with the multi $T_{int}$ approach.

Semiconductor devices and methods for forming the same in accordance with the above-described techniques can be employed in various applications, hardware, and/or electronic systems. Suitable hardware and systems for implementing embodiments of the invention may include, but are not limited to, personal computers, communication networks, electronic commerce systems, portable communications devices (e.g., cell and smart phones), solid-state media storage devices, functional circuitry, etc. Systems and hardware incorporating the semiconductor devices are contemplated embodiments of the invention. Given the teachings provided herein, one of ordinary skill in the art will be able to contemplate other implementations and applications of embodiments of the invention.

In some embodiments, the above-described techniques are used in connection with semiconductor devices that may require or otherwise utilize, for example, complementary metal-oxide-semiconductors (CMOSs), metal-oxide-semiconductor field-effect transistors (MOSFETs), and/or fin field-effect transistors (FinFETs). By way of non-limiting example, the semiconductor devices can include, but are not limited to CMOS, MOSFET, and FinFET devices, and/or semiconductor devices that use CMOS, MOSFET, and/or FinFET technology.

Figure 8:
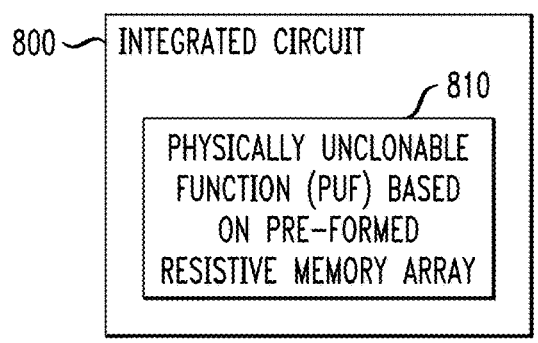
FIG. 8 depicts an integrated circuit comprising a physically unclonable function based on preformed resistive memory element structures, according to an embodiment of the invention.

Various structures described above may be implemented in integrated circuits. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either: (a) an intermediate product, such as a motherboard, or (b) an end product. The end product can be any product that includes integrated circuit chips, ranging from toys and other low-end applications to advanced computer products having a display, a keyboard or other input device, and a central processor. FIG. 8 shows an example integrated circuit 800 which includes a PUF provided by a pre-formed RRAM array 810.

In some embodiments, a semiconductor device comprises a plurality of resistive memory element structures, at least a subset of the plurality of resistive memory element structures being associated with random analog resistive states. The random analog resistive states of the subset of the plurality of resistive memory element structures provide a unique identification of the semiconductor device.

The unique identification of the semiconductor device may provide a PUF.

The random analog resistive states of the subset of the plurality of resistive memory element structures may comprise static process-induced analog resistive states. The semiconductor device may comprise an additional subset of the plurality of resistive memory element structures, the additional subset of the plurality of resistive memory element structures not having the static process-induced analog resistive states. The static process-induced analog resistive states may be a function of conductive filaments formed in the subset of the plurality of resistive memory element structures. The conductive filaments formed in the subset of the plurality of resistive memory element structures may be randomly set via an antenna effect induced by at least one of a plasma treatment and an electron beam irradiation treatment.

Each of the plurality of resistive memory element structures may comprise a first electrode, a switching layer disposed over the first electrode, and a second electrode disposed over the switching layer. The semiconductor device may further comprise a first interconnect contacting the first electrode of at least a given one of the subset of the plurality of resistive memory element structures and a second interconnect contacting the second electrode of at least the given one of the subset of the plurality of resistive memory element structures, wherein a first area of the first interconnect is smaller than a second area of the second interconnect. The first interconnect may comprise a via and the second interconnect may comprise a trench. The semiconductor device may further comprise an ILD layer surrounding the plurality of resistive memory element structures, a first metallization layer disposed in the ILD layer below the first electrodes of the subset of the plurality of resistive memory element structures, wherein the first interconnect comprises a via in the ILD layer contacting a portion of the first metallization layer, and a second metallization layer disposed in the ILD layer over the subset of the plurality of resistive memory element structures, the second metallization layer comprising the second interconnect.

In some embodiments, an integrated circuit comprises a plurality of resistive memory element structures. A first subset of the plurality of resistive memory element structures provide a PUF for the integrated circuit, the PUF comprising a unique identification provided by random analog resistive states associated with the first subset of the plurality of resistive memory element structures. A second subset of the plurality of resistive memory element structures provide memory for the integrated circuit.

The random analog resistive states of the first subset of the plurality of resistive memory element structures may comprise static process-induced analog resistive states, and the second subset of the plurality of resistive memory element structures do not have the static process-induced analog resistive states.

In some embodiments, a method comprises forming a plurality of resistive memory element structures and exposing at least a subset of the plurality of resistive memory element structures to a process that sets random analog resistive states in the subset of the plurality of resistive memory element structures.

The process that sets the random analog resistive states in the subset of the plurality of resistive memory element structures may comprise at least one of a plasma treatment and an e-beam treatment. Said at least one of the plasma treatment and the e-beam treatment is performed while a barrier layer is selectively formed over an additional subset of the plurality of resistive memory element structures.

The process that sets the random analog resistive states in the subset of the plurality of resistive memory element structures may induce an antenna effect that randomly forms conductive filaments in the subset of the plurality of resistive memory element structures.

The process that sets the random analog resistive states in the subset of the plurality of resistive memory element structures may comprise a plasma treatment. The plasma treatment may comprise a pressure of about 1 to 2000 mTorr, a plasma power of about 0.3 to 5 kW, a bias voltage of about 0 to 50V, a gas chemistry comprising at least one of Ar, $N_2$, $H_2$, He, Xe and $NH_3$, and a process time of about 0.5 to 15 minutes.

The process that sets the random analog resistive states in the subset of the plurality of resistive memory element structures may comprise an e-beam treatment. The e-beam treatment may comprise an electron energy of about 0.01 to 100 kV and a dose of about 100 to 5000 $\mu C/cm^2$.

It should be understood that the various layers, structures, and regions shown in the figures are schematic illustrations that are not drawn to scale. In addition, for ease of explanation, one or more layers, structures, and regions of a type commonly used to form semiconductor devices or structures may not be explicitly shown in a given figure. This does not imply that any layers, structures, and regions not explicitly shown are omitted from the actual semiconductor structures. Furthermore, it is to be understood that the embodiments discussed herein are not limited to the particular materials, features, and processing steps shown and described herein. In particular, with respect to semiconductor processing steps, it is to be emphasized that the descriptions provided herein are not intended to encompass all of the processing steps that may be required to form a functional semiconductor integrated circuit device. Rather, certain processing steps that are commonly used in forming semiconductor devices, such as, for example, wet cleaning and annealing steps, are purposefully not described herein for economy of description.

Moreover, the same or similar reference numbers are used throughout the figures to denote the same or similar features, elements, or structures, and thus, a detailed explanation of the same or similar features, elements, or structures are not repeated for each of the figures. It is to be understood that the terms "approximately" or "substantially" as used herein with regard to thicknesses, widths, percentages, ranges, temperatures, times and other process parameters, etc., are meant to denote being close or approximate to, but not exactly. For example, the term "approximately" or "substantially" as used herein implies that a small margin of error is present, such as ±5%, preferably less than 2% or 1% or less than the stated amount.

In the description above, various materials, dimensions and processing parameters for different elements are provided. Unless otherwise noted, such materials are given by way of example only and embodiments are not limited solely to the specific examples given. Similarly, unless otherwise noted, all dimensions and process parameters are given by way of example and embodiments are not limited solely to the specific dimensions or ranges given.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A semiconductor device comprising:
   a plurality of resistive memory element structures, at least a subset of the plurality of resistive memory element structures being associated with random analog resistive states;
   wherein the random analog resistive states of the subset of the plurality of resistive memory element structures provide a unique identification of the semiconductor device; and
   wherein the random analog resistive states of the subset of the plurality of resistive memory element structures are a function of conductive filaments in the subset of the plurality of resistive memory element structures, the conductive filaments being present in the subset of the plurality of resistive memory element structures independent of a forming voltage being applied to the subset of the plurality of resistive memory element structures, the conductive filaments remaining in the subset of the plurality of resistive memory element structures following set and reset voltage pulses applied to the subset of the plurality of resistive memory element structures.

2. The semiconductor device of claim 1, wherein the unique identification of the semiconductor device provides a physically unclonable function.

3. The semiconductor device of claim 1, wherein the random analog resistive states of the subset of the plurality of resistive memory element structures comprise static process-induced analog resistive states.

4. The semiconductor device of claim 3, further comprising an additional subset of the plurality of resistive memory element structures, the additional subset of the plurality of resistive memory element structures not having the static process-induced analog resistive states.

5. The semiconductor device of claim 3, wherein the static process-induced analog resistive states are a function of the conductive filaments in the subset of the plurality of resistive memory element structures.

6. The semiconductor device of claim 1, wherein the conductive filaments in the subset of the plurality of resistive memory element structures are randomly set via an antenna effect induced by at least one of a plasma treatment and an electron beam irradiation treatment.

7. The semiconductor device of claim 1, wherein each of the plurality of resistive memory element structures comprises a first electrode, a switching layer disposed over the first electrode, and a second electrode disposed over the switching layer.

8. The semiconductor device of claim 7, further comprising:
   a first interconnect contacting the first electrode of at least a given one of the subset of the plurality of resistive memory element structures; and
   a second interconnect contacting the second electrode of at least the given one of the subset of the plurality of resistive memory element structures;
   wherein a first area of the first interconnect is smaller than a second area of the second interconnect.

9. The semiconductor device of claim 8, wherein the first interconnect comprises a via and the second interconnect comprises a trench.

10. The semiconductor device of claim 8, further comprising:
    an interlevel dielectric layer surrounding the plurality of resistive memory element structures;
    a first metallization layer disposed in the interlevel dielectric layer below the first electrodes of the subset of the plurality of resistive memory element structures, wherein the first interconnect comprises a via in the interlevel dielectric layer contacting a portion of the first metallization layer; and
    a second metallization layer disposed in the interlevel dielectric layer over the subset of the plurality of resistive memory element structures, the second metallization layer comprising the second interconnect.

11. The semiconductor device of claim 1, wherein the conductive filaments are randomly distributed in the subset of the plurality of resistive memory element structures.

12. The semiconductor device of claim 1, wherein the subset of the plurality of resistive memory element structures are not connected to programming circuitry configured to apply a forming voltage to the subset of the plurality of resistive memory element structures.

13. The semiconductor device of claim 1, wherein the subset of the plurality of resistive memory element structures are co-located, on a same integrated circuit chip, with other ones of the plurality of resistive memory element structures providing a memory area of the integrated circuit chip.

14. An integrated circuit, comprising:
    a plurality of resistive memory element structures;
    wherein a first subset of the plurality of resistive memory element structures provide a physically unclonable function for the integrated circuit, the physically unclonable function comprising a unique identification provided by random analog resistive states associated with the first subset of the plurality of resistive memory element structures;
    wherein a second subset of the plurality of resistive memory element structures provide memory for the integrated circuit; and
    wherein the random analog resistive states of the first subset of the plurality of resistive memory element structures are a function of conductive filaments in the first subset of the plurality of resistive memory element structures, the conductive filaments being present in the first subset of the plurality of resistive memory element structures independent of a forming voltage being applied to the first subset of the plurality of resistive memory element structures, the conductive filaments remaining in the first subset of the plurality of resistive memory element structures following set and reset voltage pulses applied to the first subset of the plurality of resistive memory element structures.

15. The integrated circuit of claim 14, wherein the random analog resistive states of the first subset of the plurality of resistive memory element structures comprise static process-induced analog resistive states, and wherein the second subset of the plurality of resistive memory element structures do not have the static process-induced analog resistive states.

16. The integrated circuit of claim 14, wherein the conductive filaments in the first subset of the plurality of resistive memory element structures are randomly set via an antenna effect induced by at least one of a plasma treatment and an electron beam irradiation treatment.

17. The integrated circuit of claim 14, wherein each of the plurality of resistive memory element structures comprises a first electrode, a switching layer disposed over the first electrode, and a second electrode disposed over the switching layer.

18. The integrated circuit of claim 17, further comprising:
a first interconnect contacting the first electrode of at least a given one of the first subset of the plurality of resistive memory element structures; and
a second interconnect contacting the second electrode of at least the given one of the first subset of the plurality of resistive memory element structures;
wherein a first area of the first interconnect is smaller than a second area of the second interconnect.

19. The integrated circuit of claim 18, wherein the first interconnect comprises a via and the second interconnect comprises a trench.

20. The integrated circuit of claim 18, further comprising:
an interlevel dielectric layer surrounding the plurality of resistive memory element structures;
a first metallization layer disposed in the interlevel dielectric layer below the first electrodes of the first subset of the plurality of resistive memory element structures, wherein the first interconnect comprises a via in the interlevel dielectric layer contacting a portion of the first metallization layer; and
a second metallization layer disposed in the interlevel dielectric layer over the first subset of the plurality of resistive memory element structures, the second metallization layer comprising the second interconnect.

* * * * *